US010811670B2

(12) United States Patent
Chae et al.

(10) Patent No.: US 10,811,670 B2
(45) Date of Patent: Oct. 20, 2020

(54) PREPARING METHOD OF ELECTRODE FOR LITHIUM SECONDARY BATTERY, ELECTRODE FOR LITHIUM SECONDARY BATTERY PREPARED THEREBY AND LITHIUM SECONDARY BATTERY COMPRISING THE SAME

(71) Applicant: LG Chem, Ltd., Seoul (KR)

(72) Inventors: Oh Byong Chae, Daejeon (KR); Su Min Lee, Daejeon (KR); Eun Kyung Kim, Daejeon (KR); Sun Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 123 days.

(21) Appl. No.: 15/269,092

(22) Filed: Sep. 19, 2016

(65) Prior Publication Data

US 2017/0092930 A1     Mar. 30, 2017

(30) Foreign Application Priority Data

Sep. 21, 2015  (KR) ........................ 10-2015-0133391

(51) Int. Cl.
| | | |
|---|---|---|
| *H01M 4/04* | (2006.01) | |
| *H01M 2/16* | (2006.01) | |
| *H01M 10/0525* | (2010.01) | |
| *H01M 2/14* | (2006.01) | |
| *H01M 10/42* | (2006.01) | |
| *H01M 10/04* | (2006.01) | |
| *H01M 10/052* | (2010.01) | |
| *H01M 4/02* | (2006.01) | |

(52) U.S. Cl.
CPC ......... *H01M 4/0402* (2013.01); *H01M 2/145* (2013.01); *H01M 2/162* (2013.01); *H01M 2/1613* (2013.01); *H01M 2/1646* (2013.01); *H01M 2/1673* (2013.01); *H01M 2/1686* (2013.01); *H01M 4/0404* (2013.01); *H01M 4/0416* (2013.01); *H01M 4/0419* (2013.01); *H01M 10/0436* (2013.01); *H01M 10/0525* (2013.01); *H01M 10/4235* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | | | | |
|---|---|---|---|---|---|
| 2,484,787 A | * | 10/1949 | Grant | .................... | H01B 3/084 429/144 |
| 2,669,599 A | * | 2/1954 | Clark | .................. | H01M 2/1693 429/144 |
| 5,837,015 A | * | 11/1998 | Venugopal | .......... | H01M 2/1673 29/623.2 |
| 2006/0154140 A1 | * | 7/2006 | Yamamoto | ............. | D21H 13/16 429/142 |
| 2009/0155678 A1 | * | 6/2009 | Less | ....................... | H01M 2/166 429/144 |
| 2009/0181292 A1 | * | 7/2009 | Kaun | ................. | C04B 35/62847 429/129 |
| 2010/0167124 A1 | * | 7/2010 | Seo | ...................... | H01M 2/1673 429/212 |
| 2010/0323118 A1 | * | 12/2010 | Mohanty | .................. | H05H 1/42 427/447 |
| 2011/0217585 A1 | * | 9/2011 | Wang | ...................... | B32B 37/02 429/145 |
| 2011/0311855 A1 | * | 12/2011 | Peng | .................... | H01M 2/1653 429/144 |
| 2012/0015254 A1 | * | 1/2012 | Lee | ........................ | H01M 2/166 429/246 |
| 2012/0208070 A1 | * | 8/2012 | Nakashima | ......... | H01M 2/1646 429/158 |
| 2013/0101888 A1 | * | 4/2013 | Katayama | ........... | H01M 2/1653 429/144 |

(Continued)

FOREIGN PATENT DOCUMENTS

| | | | | | |
|---|---|---|---|---|---|
| JP | H11-345606 | | * | 12/1999 | .............. H01M 4/02 |
| JP | 2012-059486 | | * | 3/2012 | .......... H01M 10/052 |
| JP | 2012059486 | A | | 3/2012 | |
| KR | 10-2008-0010166 | | * | 9/2009 | .............. H01M 4/80 |
| KR | 100918751 | B1 | | 9/2009 | |
| KR | 10-2014-0099710 | | * | 8/2014 | ............ H01M 10/04 |
| KR | 20140099710 | A | | 8/2014 | |
| WO | WO 2014/071144 | | * | 5/2014 | .............. H01M 2/14 |
| WO | WO 2014/073937 | | * | 5/2014 | .............. H01M 2/16 |

OTHER PUBLICATIONS

Seidel et al., "PVDF-HFP/ether-modified polysiloxane membranes obtained via airbrush spraying as active separators for application in lithium ion batteries," Chem. Commun., 2015, 51, 12048-12051, Published Jun. 22, 2015 (Year: 2015).*

*Primary Examiner* — Amanda J Barrow
(74) *Attorney, Agent, or Firm* — Lerner, David, Littenberg, Krumholz & Mentlik, LLP

(57) ABSTRACT

A method for manufacturing an electrode for a lithium secondary battery having reinforced safety is provided. In some embodiments, the method includes spraying a first mixture on a surface of an active material layer to form an insulating layer, wherein the insulating layer is a porous film and consists of a polymer or consists of the polymer and a first binder material, spraying a second mixture on the insulating layer to form a safety reinforcing layer, wherein the safety reinforcing layer consists of the second binder material and the inorganic oxide, and spraying a third mixture comprising microfilaments and a third binder material on the safety reinforcing layer to form an impregnation property improving layer, wherein a weight ratio of the microfilaments to the third binder material ranges from 10:90 to 30:70, and wherein the microfilaments have diameters of 0.1 to 10 μm and lengths of 50 to 500 μm.

4 Claims, No Drawings

(56) References Cited

U.S. PATENT DOCUMENTS

| | | | | |
|---|---|---|---|---|
| 2013/0273407 A1* | 10/2013 | Kylyvnyk | ............ | H01M 2/1673 |
| | | | | 429/144 |
| 2014/0272526 A1* | 9/2014 | Huang | ................ | H01M 2/1686 |
| | | | | 429/144 |
| 2014/0295285 A1* | 10/2014 | Lee | ....................... | H01M 2/145 |
| | | | | 429/246 |
| 2015/0027615 A1* | 1/2015 | Singh | .................. | H01M 4/0419 |
| | | | | 156/60 |
| 2015/0090607 A1* | 4/2015 | Galande | ................ | H01M 10/46 |
| | | | | 205/724 |
| 2015/0140428 A1* | 5/2015 | Oono | .................... | H01M 4/133 |
| | | | | 429/221 |
| 2015/0162583 A1* | 6/2015 | Dadheech | ............. | H01M 2/145 |
| | | | | 429/144 |
| 2015/0162588 A1* | 6/2015 | Lee | ....................... | H01M 2/166 |
| | | | | 429/145 |
| 2015/0333314 A1* | 11/2015 | Pirk | ........................ | H01M 6/40 |
| | | | | 429/246 |
| 2015/0340676 A1* | 11/2015 | Schmidhauser | ...... | H01M 2/145 |
| | | | | 429/131 |
| 2017/0062786 A1* | 3/2017 | Kotov | ................... | H01M 8/188 |

* cited by examiner

PREPARING METHOD OF ELECTRODE FOR LITHIUM SECONDARY BATTERY, ELECTRODE FOR LITHIUM SECONDARY BATTERY PREPARED THEREBY AND LITHIUM SECONDARY BATTERY COMPRISING THE SAME

CROSS-REFERENCE TO RELATED APPLICATIONS

The present application claims the benefit of the priority of Korean Patent Application No. 10-2015-133391, filed on Sep. 21, 2015, which is hereby incorporated by reference in its entirety.

Technical Field

The present invention relates to a preparing method of electrode for a lithium secondary battery, an electrode for a lithium secondary battery prepared thereby and a lithium secondary battery comprising the same, and more particularly, to a preparing method of electrode for a lithium secondary battery, on which an insulating layer and a safety reinforcing layer are formed, an electrode for a lithium secondary battery manufactured therefrom, and a lithium secondary battery comprising the same.

Background Art

Demand for secondary batteries as an energy source is rapidly increasing due to the increase in technological development and demand for mobile devices. Among such secondary batteries, lithium secondary batteries, which have a high energy density and operation voltage, a long lifetime, and a low self discharge rate, have been commercialized and are widely used.

In general, lithium secondary batteries are composed of a positive electrode comprising a positive electrode active material, a negative electrode comprising a negative electrode active material, a separator, and an electrolyte and refer to chargeable and dischargeable secondary batteries via intercalation-decalation of lithium ions. Lithium secondary batteries have advantages of a high energy density, a large electromotive force, and a high capacity, and are applied in various fields.

In general, a lithium secondary battery is manufactured by alternately overlapping a positive electrode, a negative electrode, and a separator, inserting the resultant product into a battery case formed as a can or pouch having a predetermined size and shape, and finally injecting an electrolyte.

When such a secondary battery is over-charged than common charge conditions, or a negative electrode plate and a positive electrode plate of an electrode assembly are short, a mixture electrolyte of a lithium salt and an organic solvent may be decomposed at the positive electrode plate, and a lithium metal may be precipitated at the negative electrode plate to deteriorate battery properties and induce internal short. The defects accompanied with the short of the secondary battery in a common lithium secondary battery are going to be solved using the characteristics of a separator.

A separator is a polymer film disposed between a positive electrode and a negative electrode and having a porous structure, and plays the role of preventing the contact between the positive electrode and the negative electrode as well as being provided as a passage for moving lithium ions actively. Particularly, the separator of a lithium secondary battery is formed to have a greater area than a positive electrode or a negative electrode to block direct contact of two electrodes. However, when a battery in under high temperature conditions, the separator may contract, and the area thereof may decrease to be smaller than the area of an electrode plate. In this case, two plates may contact with each other, thereby generating short in a battery.

Meanwhile, since the ionic conductivity of a non-aqueous electrolyte is very low when compared to that of an aqueous electrolyte, the reaction area of the electrode is required to increase while decreasing the distance between electrode plates to accomplish a high power and a high energy density in a battery. Accordingly, attempts for increasing electrolyte concentration around a separator to promote the transfer of materials by decreasing the thickness of the separator have been conducted. However, with the decrease of the thickness of the separator, pinholes may be formed during manufacturing, or a separator may be broken to increase the possibility of inducing short, thereby generating limitations of safety deterioration.

Accordingly, developments of a novel technique solving the defects inherent in the present separator are required.

DISCLOSURE OF THE INVENTION

Technical Problem

An aspect of the present invention provides a method for manufacturing an electrode for a lithium secondary battery, on which an insulating layer and a safety reinforcing layer, which may substitute for the function of a separator of a lithium secondary battery are formed.

Another aspect of the present invention provides an electrode for a lithium secondary battery, on which an insulating layer and a safety reinforcing layer are formed, and a lithium secondary battery comprising the same.

Technical Solution

According to an aspect of the present invention, there is provided a method for manufacturing an electrode for a lithium secondary battery, comprising:

(1) preparing an electrode comprising a current collector on which an active material layer is formed;

(2) forming an insulating layer by spraying a mixture comprising a polymer on the active material layer; and (3) forming a safety reinforcing layer by spraying a mixture comprising an inorganic oxide on the insulating layer.

According to another aspect of the present invention, there are provided an electrode for a lithium secondary battery, which is manufactured by the above-described method, and on which an active material layer, an insulating layer, and a safety reinforcing layer are laminated one by one, and a lithium secondary battery comprising the electrode.

Advantageous Effects

According to the method for manufacturing a lithium secondary battery of the present invention, an electrode for a lithium secondary battery, comprising an insulating layer and a safety reinforcing layer formed on an active material layer of an electrode may be manufactured. The insulating layer and the safety reinforcing layer may function as a separator of a lithium secondary battery, and the electrode for a lithium secondary battery manufactured by the method of the present invention may be usefully used for the manufacture of a thin film-type lithium secondary battery with reinforced safety.

MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The method for manufacturing an electrode for a lithium secondary battery of the present invention includes (1) preparing an electrode comprising a current collector on which an active material layer is formed; (2) forming an insulating layer by spraying a mixture comprising a polymer on the active material layer; and (3) forming a safety reinforcing layer by spraying a mixture comprising an inorganic oxide on the insulating layer.

In step (1), an electrode including a current collector on which an active material layer may be formed may be manufactured by a common method for manufacturing an electrode for a lithium secondary battery, and the electrode may be an electrode for a lithium secondary battery in which an active material layer is formed on a current collector. The active material layer may be formed on one side or both sides of the current collector.

In step (2), a mixture comprising a polymer is sprayed on the active material layer of the electrode to form an insulating layer.

The insulating layer may be a porous polymer film comprising a plurality of pores, may prevent short between a positive electrode and a negative electrode, may permit the penetration of an electrolyte, and may provide a passage so that lithium ions included in a lithium secondary battery may move actively. Accordingly, the insulating layer may function as a separator included in a common lithium secondary battery.

The pores included in the insulating layer may have an average diameter ($D_{50}$) when measured at the surface thereof from 1 nm to 50 µm, particularly, 10 nm to 10 µm, and more particularly, 10 nm to 5 µm. In the case where the average diameter ($D_{50}$) of the pores is 1 nm or more, an electrolyte may easily pass through the insulating layer, and in the case where the average diameter ($D_{50}$) of the pores is 50 µm or less, the electrolyte may easily pass through the insulating layer but may prevent the cross-over of an active material through the insulating layer.

In the present invention, an average diameter ($D_{50}$) or an average particle diameter ($D_{50}$) may be defined as a particle diameter based on 50% of particle diameter distribution. The average diameter or the average particle diameter may be measured using, for example, a laser diffraction method or a scanning electron microscope (SEM) photograph, without specific limitation. According to the laser diffraction method, a particle diameter in a range from a submicron degree to a few mm degrees may be measured, and results with high reproducibility and high resolution may be obtained.

The insulating layer may have a porosity of 5 to 60%, and particularly, a porosity of 30 to 50%.

In the case where the insulating layer has a porosity of 5% or more, an insulating layer may easily pass through the insulating layer, and in the case where the porosity is 60% or less, the insulating layer may have an appropriate degree of strength.

In order to form the pores, the mixture comprising a polymer may further include a pore forming agent. The pores may be formed by spraying the mixture and removing the pore forming agent from the sprayed mixture during forming the insulating layer. The sprayed mixture may be a layer forming an insulating layer. After removing the pore forming agent from the sprayed mixture, spaces occupied by the pore forming agent may remain vacant to form the pores.

The pore forming agent may include liquid paraffin, paraffin oil, mineral oil, paraffin wax, soybean oil, sunflower oil, rapeseed oil, palm oil, coconut oil, coconut oil, corn oil, grape seed oil, cottonseed oil, and at least one dialkyl phthalate selected from the group consisting of di-2-ethylhexyl phthalate, di-butyl-phthalate, di-isononyl phthalate, di-isodecyl phthalate, and butyl benzyl phthalate.

The insulating layer may have a thickness of 1 to 50 µm, particularly, 5 to 30 µm, and more particularly, 5 to 20 µm. In the case where the thickness of the insulating layer is 1 µm or more, the insulating layer may exhibit an appropriate degree of strength, and in the case where the thickness of the insulating layer is 50 µm or less, the total thickness of an electrode may decrease, and the thinning of a lithium secondary battery comprising the electrode may be accomplished.

The polymer used for forming the insulating layer may include at least one selected from the group consisting of polyolefin such as polyethylene and polypropylene, polyester such as polyethylene terephthalate and polybutylene terephthalte, polyamide such as aramide, polyacetal, polycarbonate, polyimide, polyether ketone, polyether sulfone, polyphenylene oxide, polyphenylene sulfide, polyethylene naphthalene, polytetrafluoroethylene, polyfluorinated vinylidene, polyvinyl chloride, polyacrylonitrile, cellulose, nylon, polyparaphenylene benzobisoxazole and polyarylate. Particularly, a polyolefin polymer may be used, and more particularly, at least one selected from the group consisting of polyethylene, polypropylene, polybutylene and polystyrene may be used.

The mixture comprising a polymer may further include a hinder material, and the polymer and the binder material may he mixed in a weight ratio of 99:1 to 80:20, and particularly, 95:5 to 90:10. By adding the binder material to the mixture comprising a polymer, the polymer may be combined with the active material layer much more firmly.

The binder material may include at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethylmethacrylate, polyacrylonitrile, polyvinylpyrrolidone, polyvinyl acetate, an ethylene vinylacetate copolymer, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, an acrylonitrile styrenebutadiene copolymer, polyimide, and a styrene butadiene rubber (SBR).

The spraying of the mixture comprising a polymer instep (2) may be performed using the mixture comprising a polymer with a spray procedure of 5 to 50 kgf/cm², particularly, 10 to 40 kgf/cm², and more particularly, 15 to 30 kgf/cm².

In step (3), a safety reinforcing layer is formed by spraying a mixture comprising an inorganic oxide on the insulating layer.

The safety reinforcing layer is formed on the insulating layer to improve the mechanical strength of the insulating layer and to improve the safety against thermal contraction.

The inorganic oxide may be one selected from the group consisting of $Al_2O_3$, $BaTiO_3$, CaO, $CeO_2$, NiO, MgO, $SiO_2$, $SnO_2$, $SrTiO_3$, $TiO_2$, $Y_2O_3$, ZnO, $ZrO_2$, Pb (Zr, Ti)$O_3$ (PZT) (Pb, La) (Zr, Ti)$O_3$ (PLZT), PB $(Mg_3Nb_{2/3})O_3$—$PbTiO_3$ (PMN-PT) and hafnia ($HfO_2$), and particularly, one selected from the group consisting of $Al_2O_3$, $SiO_2$, $Y_2O_3$ and $ZrO_2$ may be used.

In this case, the inorganic oxide may have a particle shape and do average particle diameter ($D_{50}$) of 1 nm to 10 μm, particularly, 0.01 to 7 μm, and more particularly, 0.1 to 5 μm. In the case where the average particle diameter of the inorganic oxide is 1 nm or more, an appropriate dispersibility may be exhibited and the inhibition of the movement of lithium ions by the inorganic oxide may be prevented. In the case where the average particle diameter of the inorganic oxide is 10 μm or less, excessive increase of the thickness of the safety reinforcing layer may be restrained, and the thickness of a whole electrode may be kept in an appropriate range.

inorganic oxide may include pores, and an average diameter ($D_{50}$) of the pores may be from 1 to 100 nm, and particularly, from 10 to 50 nm.

In the case where the average diameter ($D_{50}$) of the pores is 1 nm or more, an electrolyte may penetrate into the pores included in the inorganic oxide, and impregnation property with the electrolyte may be improved. In the case where the average diameter ($D_{50}$) of the pores is 100 nm or less, limitations comprising not maintaining the particle shape of the inorganic oxide due to excessively increased pore size, and excessive increase of inorganic oxide particles comprising the pores more than necessary according to the increase of the pore size, may be avoided.

The mixture comprising an inorganic oxide may further include a binder material, and the inorganic oxide and the binder material may be mixed in a weight ratio of 99:1 to 80:20, and particularly, 95:5 to 90:10. By adding the binder material to the mixture comprising an inorganic oxide, the inorganic oxide may be combined with the insulating layer much more firmly.

The binder material may include at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethylmethacrylate, polyacrylonitrile, polyvinylpyrrolidone, polyvinyl acetate, an ethylene vinylacetate copolymer, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, an acrylonitrile styrenebutadiene copolymer, polyimide, and a styrene butadiene rubber (SBR).

The safety reinforcing layer may have a porosity of 20 to 70%, and particularly, 30 to 40%. In the case where the safety reinforcing layer has a porosity of 20% or more, the inhibition of lithium movement by the safety reinforcing layer may be avoided, and in the case where the porosity is 70% or less, the strength of the safety reinforcing layer may be appropriately kept, the mechanical strength of the insulating layer may increase, and safety improving effect against thermal contraction may be attained.

The safety reinforcing layer may have a thickness of 0.1 to 30 μm, particularly, 1 to 20 μm, and more particularly, 2 to 10 μm. In the case where the thickness of the safety reinforcing layer is 0.1 μm or more, the safety reinforcing layer may exhibit an appropriate degree of strength, the mechanical strength of the insulating layer may increase, and safety improving effect against thermal contraction may be attained. In the case where the thickness of the safety reinforcing layer is 30 μm or less, the thinning of a lithium secondary battery comprising thereof may be accomplished by decreasing the total thickness of an electrode.

The spraying of the mixture comprising an inorganic oxide in step (3) may be performed using the mixture comprising an inorganic oxide with a spray pressure of 5 to 50 kgf/cm², particularly, 10 to 40 kgf/cm², and more particularly, 15 to 30 kgf/cm².

In an embodiment of the present invention, after spraying the mixture, a drying process in vacuum may be performed, and through the drying process in vacuum, pores may be formed in the safety reinforcing layer thus formed.

The mixture comprising an inorganic oxide may additionally include microfilaments.

The microfilament may be a polymer fiber or a glass fiber and may have a diameter of 0.1 to 10 μm and a length of 50 to 500 μm, and particularly, a diameter of 1 to 5 μm and a length of 100 to 300 μm. The microfilaments may be interconnected with each other in the safety reinforcing layer to form a spider-web structure, and through the structure, impregnation property with an electrolyte may be improved.

The microfilaments may be included in an amount ratio of 5 to 50 wt %, and particularly, 10 to 30 wt % on the basis of the mixture comprising an inorganic oxide.

In addition, the method for manufacturing an electrode for a lithium secondary battery according to an embodiment of the present invention may further include (4) forming an impregnation property improving layer by spraying a mixture comprising microfilaments on the safety reinforcing layer. In the case where the impregnation property improving layer is formed, the safety reinforcing layer may not additionally include the microfilaments.

The microfilament may be a polymer fiber or a glass fiber and may have a diameter of 0.1 to 10 μm and a length of 50 to 500 μm, and particularly, a diameter of 1 to 5 μm and a length of 100 to 300 μm. The microfilaments may be interconnected with each other in the impregnation property improving layer to form a spider-web structure, and through the structure, impregnation property with an electrolyte may be improved.

The mixture comprising microfilaments may contain the microfilaments and a binder material. Due to the binder material, the microfilaments may make interconnection with each other to form a spider-web structure and be fixed, and the impregnation property improving layer may adhere to the safety reinforcing layer.

As the binder material, the binder materials illustrated in the explanation on the safety reinforcing layer may be used, and the microfilaments and the binder material may be included in an amount ratio of 5:95 to 50:50, and particularly, 10:90 to 30:70.

The spider-web structure formed by the microfilaments may form pores, and the pores may have an average diameter ($D_{50}$) of 1 nm to 50 μm, particularly, 10 nm to 10 μm, and more particularly, 10 nm to 5 μm when measured at the surface thereof.

The impregnation property improving layer may have a porosity of 20 to 70%, and particularly, 30 to 40%.

The impregnation property improving layer may have a thickness of 0.1 to 3 µm, particularly, 1 to 20 µm, and more particularly, 5 to 10 µm. In the case where the thickness of the impregnation property improving layer is 0.1 µm or more, the impregnation property improving layer may exhibit an appropriate degree of hydrophilicity, and in the case where the thickness of the impregnation property improving layer is 30 µm or less, the thinning of a lithium secondary battery comprising thereof may be accomplished by decreasing the total thickness of an electrode.

If the impregnation property improving layer has hydrophilicity, the impregnation property with an electrolyte may be improved. Particularly, the impregnation property improving layer may have a water contact angle of 1 to 50°, and particularly, 10 to 30°.

The electrode for a lithium secondary battery manufactured by the manufacturing method of the present invention described above may include an active material layer, an insulating layer, and a safety reinforcing layer laminated one by one, and an impregnation property improving layer may be laminated on the safety reinforcing layer as occasion demands.

In addition, since the insulating layer and the safety reinforcing layer are firmly laminated on the active material layer, even though the shape of an electrode may be deformed, for example, in a flexible battery, the risk of short due to the change of the positions of an electrode and a separator due to the deformation may be prevented. In addition, since the insulating layer and the safety reinforcing layer are formed via spraying, even though the shape of the electrode itself may be curved and the cutting of a separator according to the shape of the electrode may be difficult, the insulating layer and the safety reinforcing layer may be appropriately formed and provide the function as separators.

In addition, the electrode may have a thickness of 30 to 150 µm, and particularly, 80 to 120 µm. That is, since the electrode for a lithium secondary battery manufactured by the method of the present invention may have a thickness of 150 µm or less, the thickness may have a smaller value than the total thickness of a common electrode and a separator.

The electrode for a lithium secondary battery may be a positive electrode or a negative electrode.

The electrode may have an impregnation time period with an electrolyte of 10 seconds to 4 hours, particularly, 10 seconds to 1 hour, and more particularly, 30 seconds to 30 minutes to exhibit improved electrolyte impregnation property with an electrolyte. In this case, the electrolyte impregnation time period represents a time period for complete impregnation after dropping 10 µl of propylene carbonate on the surface of a positive electrode.

In addition, there is provided in the present invention a lithium secondary battery comprising the electrode but not comprising an additional separator.

The lithium secondary battery may include the electrode as a positive electrode and a negative electrode, or as a positive electrode or a negative electrode. Since an insulating layer and a safety reinforcing layer are formed on the electrode, an additional separator is not required.

In the case where the electrode in which an active material layer is formed on a current collector in step (1) is a positive electrode, the positive electrode may be manufactured by a typical method known in the art. For example, a binder, a conductive agent, and a dispersant, if necessary, as well as a solvent are mixed with a positive electrode active material and stirred to prepare a slurry, and a metal current collector is then coated with the slurry and pressed. Thereafter, the positive electrode may be manufactured by drying the coated metal current collector.

Any metal may be used as the metal current collector so long as it is a metal having high conductivity as well as not causing adverse chemical changes in the battery in a voltage range of the battery to which the slurry of the positive electrode active material may be easily adhered, and, for example, stainless steel, aluminum, nickel, titanium, fired carbon, or aluminum or stainless steel that is surface-treated with one of carbon, nickel, titanium, silver, or the like may be used. Also, the current collector may have an uneven surface to improve the bonding strength of the positive electrode active material. The current collector may be used in various shapes, such as that of a film, a sheet, a foil, a net, a porous body, a foam body, a non-woven fabric body, and the like, and may have a thickness of 3 to 500 µm.

Examples of the positive electrode active material may be a layered compound, such as lithium cobalt oxide (LiCoO2); lithium nickel oxide (LiNiO$_2$); Li[Ni$_a$Co$_b$Mn$_c$M$^1_d$]O$_2$ (where M$^1$ is any one selected from the group consisting of aluminum (Al), gallium (Ga), and indium (In), or two or more elements thereof, and 0.3≤a<0.1, 0≤b≤0.5, 0≤c≤0.5, 0≤d≤0.1, and a+b+c+d=1); Li(Li$_e$M$^2_{f-e-f'}$M$^3_{f'}$)O$_{2-g}$A$_g$ (where 0≤f≤0.2, 0.6≤f≤1, 0≤f'≤0.2, and 0≤g≤0.2, M$^2$ includes manganese (Mn) and at least one selected from the group consisting of nickel (Ni), cobalt (Co), iron (Fe), chromium (Cr), vanadium (V), copper (Cu), zinc (Zn), and titanium (Ti), M$^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as Li$_{i+h}$Mn$_{2-h}$O$_4$ (where 0≤h≤0.33), LiMnO$_3$, LiMn$_2$O$_3$, and LiMnO$_2$; lithium copper oxide (Li$_2$CuO$_2$); vanadium oxides such as LiV$_3$O$_8$, V$_2$O$_5$, and Cu$_2$V$_2$O$_7$; Ni-site type lithium nickel oxide represented by the chemical formula LiNi$_{1-i}$M$^4_i$O$_2$ (where M$^4$ is Co, Mn, Al, Cu, Fe, Mg, B, or Ga, and 0.01≤y≤0.3); lithium manganese complex oxide represented by the chemical formula LiMn$_{2-j}$M$^5_j$O$_2$ (where M$^5$ is Co, Ni, Fe, Cr, Zn, or tantalum (Ta), and 0.01≤y≤0.1) or Li$_2$Mn$_3$M$^6$O$_8$ (where M$^6$ is Fe, Co, Ni, Cu, or Zn); LiMn$_2$O$_4$ having a part of lithium (Li) being substituted with alkaline earth metal ions; a disulfide compound; LiFe$_3$O$_4$, and Fe$_2$(MoO$_4$)$_3$. However, the positive electrode active material is not limited thereto.

An organic solvent, such as N-methylpyrrolidone (NMP), dimethylformamide (DMF), acetone, and dimethylacetamide, or water, may be used as the solvent for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogen atoms thereof are substituted with Li, sodium (Na), or calcium (Ca), or various copolymers, may be used as the binder.

Any conductive agent may be used without particular limitation so long as it has suitable conductivity without causing adverse chemical changes in the battery. For example, the conductive agent may include a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 20 wt % based on the total weight of the positive electrode slurry.

An aqueous dispersant or an organic dispersant such as N-methyl-2-pyrrolidone, may be used as the dispersant.

In the case where the electrode in which an active material layer formed on the current collector in step (1) is a negative electrode, the negative electrode may be manufactured by a typical method known in the art. For example, additives, such as a binder, and a conductive agent are mixed with a negative electrode active material and stirred to prepare a negative electrode active material slurry, and a negative electrode current collector may then be coated with the slurry, dried, and pressed to manufacture the negative electrode.

A carbon material, a lithium metal, silicon, or tin, which may intercalate and deintercalate lithium ions, may be typically used as the negative electrode active material that is used in the negative electrode. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The binder may be used for maintaining a molded article by binding negative electrode active material particles, wherein the binder is not particularly limited as long as it is typically used in the preparation of the slurry for a negative electrode active material, but, for example, as a non-aqueous binder, polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene, or polypropylene may be used, and, as a aqueous binder, any one selected from the group consisting of an acrylonitrile-butadiene rubber, a styrene-butadiene rubber, and an acryl rubber or a mixture of two or more thereof may be used. Since the aqueous binder, different from the non-aqueous binder, may be economical and environmentally friendly, may not be harmful to the health of workers, and may have binding effect larger than that of the non-aqueous binder, a ratio of the active material for the same volume may be increased. Thus, the capacity of the lithium secondary battery may be increased, and a styrene-butadiene rubber may be used as the aqueous binder.

The binder may be included in an amount of 10 wt % or less based on a total weight of the slurry for a negative electrode active material, and may be specifically included in an amount of 0.1 wt % to 10 wt %. In the case where the amount of the binder is less than 0.1 wt %, it is not desirable because an effect due to the use of the binder is insignificant, and, in the case where the amount of the binder is greater than 10 wt %, it is not desirable because capacity per volume may be reduced due to a decrease in the relative amount of the active material according to the increase in the amount of the binder.

Any conductive agent may be used without particular limitation so long as it has suitable conductivity without causing adverse chemical changes in the battery, and examples of the conductive agent may be a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode current collector used in the negative electrode according to an embodiment of the present invention may have a thickness of 3 μm to 500 μm. Any material may be used as the negative electrode current collector so long as it has conductivity as well as not causing adverse chemical changes in the battery, and, for example, copper, gold, stainless steel, aluminum, nickel, titanium, fired carbon, aluminum or stainless steel that is surface-treated with one of carbon, nickel, titanium, silver, or the like, or an aluminum-cadmium alloy may be used. Also, the current collector may have an uneven surface to improve the bonding strength of the negative electrode active material. The current collector may be used in various shapes, such as that of a film, a sheet, a foil, a net, a porous body, a foam body, a non-woven fabric body, and the like.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BP_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF3CF2SO_2)2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte which may be used in the preparation of the lithium secondary battery, but the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

Preferred examples of the medium and large sized device may be an electric vehicle, a hybrid electric vehicle, a plug-in hybrid electric vehicle, or a power storage system, but the medium and large sized device is not limited thereto.

EXAMPLES

Hereinafter, the present invention will be described in more detail, according to examples and experimental example, but the present invention is not limited thereto. The invention may be embodied in many different forms and should not be construed as being limited to the embodiments set forth herein.

Rather, these example embodiments are provided so that this description will be thorough and complete, and will fully convey the scope of the present invention to those skilled in the art.

Example 1

<Manufacture of a Positive Electrode>

A positive electrode mixture slurry was prepared by adding 94 wt % of Li ($Li_{1.2}Co_{0.1}Ni_{0.1}Mn_{0.6}$)$O_2$ as a positive electrode active material, 3 wt % of carbon black as a conductive agent, and 3 wt % of PVdF as a bonding agent to an N-methyl-2-pyrrolidone (NMP) solvent. An aluminum (Al) thin film which was a positive electrode current collector with a thickness of about 20 μm was coated with the positive electrode mixture slurry and dried to manufacture a positive electrode. Then, the positive electrode was roll pressed.

On the surface of the product on which the positive electrode active material layer was formed a mixture solution obtained by mixing 5 g of polyethylene, 3 g of paraffin oil, and 2 g of polymethylmethacrylate with 100 ml of an N-methyl-2-pyrrolidone solvent was sprayed using a sprayer (manufactured by Gilmour Co.) with a spray pressure of 10 kgf/$cm^2$ to form an insulating layer having a thickness of 8 μm, and an average pore size of 100 nm. On the insulating layer thus manufactured, a mixture solution obtained by dissolving 5 g of $Al_2O_3$, and 2 g of polymethylmethacrylate in 100 ml of an N-methyl-2-pyrrolidone solvent was sprayed and deposited using a sprayer (manufactured by Gilmour Co.) with a spray pressure of 10 kgf/$cm^2$ and dried in a vacuum oven for 5 hours to form a safety reinforcing layer having a thickness of 2 μm and an average pore size of 200 nm.

<Manufacture of a Negative Electrode>

A negative electrode mixture slurry was prepared by adding 96 wt % of natural graphite, 1 wt % of Denka black (conductive agent), 2 wt % of SBR (binding agent), and 1 wt % of CMC (thickener) to water. One side of a copper current collector was coated with the negative electrode mixture slurry thus prepared to a thickness of 65 μm, dried, pressed, and punched to a constant size to manufacture a negative electrode.

On the surface of the product on which the negative electrode active material layer was formed, a mixture solution obtained by mixing 5 g of polyethylene, 3 g of paraffin oil, and 2 g of polymethylmethacrylate with 100 ml of an N-methyl-2-pyrrolidone solvent was sprayed using a sprayer (manufactured by Gilmour Co.) with a spray pressure of 10 kgf/$cm^2$ to form an insulating layer having a thickness of 8 μm, and an average pore size of 100 nm. On the insulating layer thus manufactured, a mixture solution obtained by mixing 5 g of $Al_2O_3$, and 2 g of polymethylmethacrylate with 100 ml of an N-methyl-2-pyrrolidone solvent was sprayed using a sprayer (manufactured by Gilmour Co.) with a spray pressure of 10 kgf/$cm^2$ to form a safety reinforcing layer having a thickness of 2 μm and an average pore size of 200 nm.

Examples 2 to 7

A positive electrode and a negative electrode were manufactured by conducting the same procedure described in Example 1 except that the spray pressure during forming the insulating layer and the safety reinforcing layer on the positive electrode active material layer and the negative electrode active material layer manufactured in Example 1 was changed to 2, 5, 15, 20, 25 and 30 kgf/$cm^2$, respectively.

Example 8

A positive electrode and a negative electrode were manufactured by conducting the same procedure described in Example 1 except for changing the thickness of the insulating layer and the thickness of the safety reinforcing layer formed on the positive electrode active material layer and the negative electrode active material layer manufactured in Example 1 to 16 μm and 4 μm, respectively.

Example 9

An impregnation property improving layer having a thickness of 2 μm and an average pore size of 1 μm was formed by spraying a mixture solution obtained by mixing 5 g of a non-woven fabric which was pulverized to have a length of one side of 10 to 20 μm, and 2 g of polymethylmethacrylate with 100 ml of an N-methyl-2-pyrrolidone solvent on each safety reinforcing layer of the positive electrode and the negative electrode manufactured in Example 1 using a sprayer (manufactured by Gilmour Co.) with a spray pressure of 10 kgf/$cm^2$.

Example 10

A positive electrode, a negative electrode, an insulating layer and a safety reinforcing layer were formed by conducting the same procedure described in Example 1 except for using a curved aluminum thin film having a radius of curvature of 1 cm and a length of about 3 cm, and a copper current collector as the positive electrode current collector and the negative electrode current collector, respectively.

Examples 11 to 19

Lithium secondary batteries were manufactured by inserting a positive electrode on which an insulating layer and a safety reinforcing layer were formed in each of Examples 1 to 9 and a negative electrode prior to forming an insulating layer and a safety reinforcing layer in each of Examples 1 to 9 into a prismatic type battery case, and injecting an electrolyte in which 1 M $LiPF_6$ was dissolved in a mixture solvent of ethylene carbonate (EC) and diethyl carbonate (DEC) in a volume ratio of 30:70.

Example 20

A lithium secondary battery was manufactured by inserting a positive electrode on which an insulating layer and a safety reinforcing layer were formed in Example 10 and a negative electrode prior to forming an insulating layer and a safety reinforcing layer in Example 10 into a prismatic type battery case of which side portion is bent in a curve shape, and injecting an electrolyte in which 1 M LiPF$_6$ was dissolved in a mixture solvent of EC and DEC in a volume ratio of 30:70.

Comparative Example 1

The positive electrode and the negative electrode manufactured in Example 1 were used as a positive electrode and a negative electrode without forming an insulating layer and a safety reinforcing layer.

Comparative Example 2

A positive electrode and a negative electrode were manufactured by conducting the same procedure described in Example 1 except for changing the spray pressure during forming an insulating layer and a safety reinforcing layer on a positive electrode active material layer and a negative electrode active material layer to 1 kgf/cm$^2$, respectively.

Comparative Example 3

A positive electrode and a negative electrode were manufactured by conducting the same procedure described in Example 1 except for changing the spray pressure during forming an insulating layer and a safety reinforcing layer on a positive electrode active material layer and a negative electrode active material layer to 40 kgf/cm$^2$, respectively.

Comparative Example 4

The positive electrode and the negative electrode manufactured in Example 10 were used as a positive electrode and a negative electrode without forming an insulating layer and a safety reinforcing layer.

Comparative Example 5

A lithium secondary battery was manufactured by disposing a polyolefin separator with a thickness of 20 μm between the positive electrode and the negative electrode in Comparative Example 1, inserting thus obtained product into a prismatic type battery case, and injecting an electrolyte in which 1 M LiPF$_6$ was dissolved in a mixture solvent of EC and DEC in a volume ratio of 30:70.

Comparative Examples 6 and 7

Lithium secondary batteries were manufactured by inserting the positive electrode and the negative electrode, manufactured in each of Comparative Examples 2 and 3 into a prismatic type battery case, and injecting an electrolyte in which 1 M LiPF$_6$ was dissolved in a mixture solvent of EC and DEC in a volume ratio of 30:70.

Comparative Example 8

On a polyolefin separator with a thickness of 20 μm, a mixture solution obtained by mixing 5 g of Al$_2$O$_3$ and 2 g of polymethylmethacrylate with 100 ml of an N-methyl-2-pyrrolidone solvent was sprayed using a sprayer (manufactured by Gilmour Co.) with a spray pressure of 10 kgf/cm$^2$ to form a safety reinforcing layer having a thickness of 2 μm, and an average pore size of 200 nm.

A lithium secondary battery was manufactured by conducting the same procedure described in Comparative Example 5 except for using the positive electrode and the negative electrode of Comparative Example 4 instead of the positive electrode and the negative electrode of Comparative Example 1, bending a separator on which the safety reinforcing layer was formed according to the shape of the positive electrode and the negative electrode, and disposing the separator between the positive electrode and the negative electrode.

Experimental Example 1

Evaluation on the Shape of Positive Electrode and Negative Electrode

The porosity of the positive electrodes manufactured in Examples 2 to 7 and Comparative Examples 2 and 3 were calculated and are listed in Table 1 below.

In this case, the porosity=1−(real density/true density), where the real density is a density of an electrode comprising pores, and the true density is a density of a solid not comprising pores.

Experimental Example 2

Evaluation on Discharge Capacity of Battery

Lithium secondary batteries manufactured in Examples 12 to 17 and Comparative Examples 6 and 7 were charged and discharged at a current density of 2 C rate, and discharge capacity at the second cycle of a battery was measured. The results were evaluated as a relative value with the result of Example 14, which was the highest value, 100%, and the resulting values are listed in Table 1 below.

TABLE 1

|  | Comparative Example 6 | Example 12 | Example 13 | Example 14 | Example 15 | Example 16 | Example 17 | Comparative Example 7 |
|---|---|---|---|---|---|---|---|---|
| Spray pressure (kgf/cm$^2$) | 1 | 2 | 5 | 15 | 20 | 25 | 30 | 40 |
| Porosity (%) | 72 | 60 | 51 | 35 | 28 | 24 | 21 | 17 |
| Discharge capacity (%) | 87 | 94 | 98 | 100 | 97 | 94 | 89 | 77 |

Referring to Table 1, the porosity difference was generated and thus, discharge capacity difference was generated according to the spray pressure during forming the insulating layer and the safety reinforcing layer. Among them, in the case where the insulating layer and the safety reinforcing layer were formed on the positive electrode and the negative electrode, respectively with the spray pressure of 15 kgf/cm$^2$, the discharge capacity of a battery comprising the same was the best. Meanwhile, in the case where the spray pressure was too low as in Comparative Example 6, lots of pores were formed in the insulating layer and the safety reinforcing layer, and high porosity was attained in the aggregate. However, the thickness of the insulating layer and the safety reinforcing layer was too thick, and performance deterioration due to the separation between the positive electrode and the negative electrode was too large when considering the improving effect of ion mobility. On the contrary, in the case where the spray pressure was too large as in Comparative Example 7, the porosity of the insulating layer and the safety reinforcing layer was too small, and ion mobility was decreased, thereby deteriorating battery performance.

Experimental Example 2

Evaluation on Safety

In order to apprehend the safety of the battery manufactured in Example 20 and the battery manufactured in Comparative Example 8, a nail penetration teat was conducted in a full charge state. As a result, the battery temperature increased to about 100° C. and ignition was not generated for Example 10. However, the battery temperature exceeded 100° C. and ignition was generated for Comparative Example 8.

From the results, it can be secured that the safety property was better for the battery of Example 20 in which the insulating layer and the safety reinforcing layer were formed via direct spraying on an electrode, when compared to the battery of Comparative Example 8 in which an additional separator obtained by coating Al$_2$O$_3$ on a polyolefin separator was disposed. The difference was attained as follows. In the case where the separator was additionally included in the battery of Comparative Example 8, the separator was contracted due to heat generated during the nail penetration test, thereby accelerating short between a positive electrode and a negative electrode. However, in the case where the insulating layer and the safety reinforcing layer were formed on the electrode as in Example 20, short between a positive electrode and a negative electrode due to the contraction of the insulating layer and the safety reinforcing layer was not generated, because the insulating layer and the safety reinforcing layer were firmly fixed to the electrode even though heat was generated during the nail penetration test.

Experimental Example 3

Evaluation on Hygroscopic Property

In order to apprehend the impregnation property of the electrode manufactured in Example 1 and the battery manufactured in Example 9, 10 µl of a propylene carbonate electrolyte was dropped on the surface of an electrode on which a separator was coated, and a time period required for complete absorption into the electrode was measured.

For the complete absorption of the propylene carbonate electrolyte, 85 seconds was taken for the electrode of Example 1, and 34 seconds was taken for the electrode of Example 9. Through the results, it is secured that impregnation effect with an electrolyte could be improved with the additional formation of an impregnation property improving layer.

The scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A method for manufacturing an electrode for a lithium secondary battery, the method comprising:
spraying a first mixture comprising a polymer, or comprising the polymer and a first binder material, on a surface of an active material layer to form an insulating layer, wherein the active material layer is disposed on a current collector, and wherein the insulating layer is a porous film and consists of the polymer or consists of the polymer and the first binder material; and
spraying a second mixture on the insulating layer to form a safety reinforcing layer, wherein the second mixture comprises a second binder material and inorganic oxide particles, wherein the inorganic oxide and the second binder material are mixed in a weight ratio of 99:1 to 80:20, and wherein the safety reinforcing layer consists of the second binder material and the inorganic oxide; and
spraying a third mixture comprising microfilaments and a third binder material on the safety reinforcing layer to form an impregnation property improving layer, wherein a weight ratio of the microfilaments to the third binder material ranges from 10:90 to 30:70, and wherein the microfilaments have diameters of 0.1 to 10 µm and lengths of 50 to 500 µm.

2. The method for manufacturing an electrode for a lithium secondary battery of claim 1, wherein the microfilaments are polymer fibers or glass fibers.

3. The method for manufacturing an electrode for a lithium secondary battery of claim 2, wherein the impregnation property improving layer consists of the microfilaments and the third binder material.

4. The method for manufacturing an electrode for a lithium secondary battery of claim 1, wherein the microfilaments are glass fibers.

* * * * *